US012628806B2

(12) United States Patent　　(10) Patent No.:　US 12,628,806 B2
Platz　　　　　　　　　　　　　　　(45) Date of Patent:　　　May 19, 2026

(54) ICE FISHING APPARATUS WITH AUDIBLE AND VISUAL BITE INDICATOR

(71) Applicant: Dennis Platz, Kiel, WI (US)

(72) Inventor: Dennis Platz, Kiel, WI (US)

( * ) Notice: Subject to any disclaimer, the term of this patent is extended or adjusted under 35 U.S.C. 154(b) by 0 days.

(21) Appl. No.: 19/092,571

(22) Filed: Mar. 27, 2025

(65) Prior Publication Data

US 2025/0248384 A1　　Aug. 7, 2025

Related U.S. Application Data

(62) Division of application No. 17/989,573, filed on Nov. 17, 2022, now Pat. No. 12,290,059.

(51) Int. Cl.
　　*A01K 97/01*　　　　(2006.01)
(52) U.S. Cl.
　　CPC ................................... *A01K 97/01* (2013.01)
(58) Field of Classification Search
　　CPC ...... A01K 97/125; A01K 97/12; A01K 97/01;
　　　　　　　　　　　　　　A01K 97/00; A01K 97/10
　　USPC ................................... 43/17, 16, 15, 4, 21.2
　　See application file for complete search history.

(56) References Cited

U.S. PATENT DOCUMENTS

| | | | |
|---|---|---|---|
| 2 | A | 7/1836 | Goulding |
| 522,352 | A | 7/1894 | Poppowitsch |
| 2,783,574 | A | 3/1957 | Paget |
| 2,834,140 | A | 5/1958 | Knier |
| 3,470,647 | A | 10/1969 | Horner |
| 3,641,693 | A | 2/1972 | Pinnow |
| 4,021,958 | A | 5/1977 | Snodie |
| 4,142,316 | A | 3/1979 | Greer et al. |
| 4,146,988 | A | 4/1979 | Bednarczyk |
| 4,373,287 | A | 2/1983 | Grahl |
| 4,467,548 | A * | 8/1984 | Tabor ..................... A01K 97/06 |
| | | | D22/142 |
| 4,685,240 | A | 8/1987 | Fralick |
| 4,727,673 | A | 3/1988 | Dumar |
| 4,845,878 | A | 7/1989 | Hackel |
| 4,945,668 | A | 8/1990 | Keller |
| 4,980,986 | A | 1/1991 | Harper |
| 4,993,182 | A | 2/1991 | Monsen |
| 5,020,263 | A | 6/1991 | Werner |
| 5,067,269 | A | 11/1991 | Eppley et al. |
| 5,097,618 | A | 3/1992 | Stoffel |
| 5,157,855 | A | 10/1992 | Schmidt et al. |
| 5,339,558 | A | 8/1994 | Monsen |
| 5,448,849 | A | 9/1995 | Burgett |
| 5,586,402 | A | 12/1996 | Brent et al. |
| 5,598,656 | A | 2/1997 | Strasser |
| 5,682,703 | A | 11/1997 | Corbiere |
| 7,032,343 | B1 | 4/2006 | Foss |
| 7,946,076 | B2 | 5/2011 | Gascoingne |
| 8,978,288 | B2 | 3/2015 | Olson et al. |
| 9,095,130 | B2 | 8/2015 | Coulson |
| 10,524,460 | B1 | 1/2020 | Konitzer et al. |

(Continued)

*Primary Examiner* — Timothy D Collins
*Assistant Examiner* — Maria E Graber
(74) *Attorney, Agent, or Firm* — Foley & Lardner LLP

(57)　　　　　　　ABSTRACT

An ice fishing apparatus with an integrated audible and visual bite indication includes a handle portion having a first end, a second end opposite the first end, and a hollow region extending at least partially therebetween, a rod blank coupled to the first end of the handle, and an indicator and circuit assembly disposed at least partially within the hollow region.

20 Claims, 10 Drawing Sheets

(56) References Cited

U.S. PATENT DOCUMENTS

| 12,290,059 B2 * | 5/2025 | Platz | ..................... A01K 97/125 |
| 2006/0117638 A1 | 6/2006 | Park | |
| 2011/0067290 A1 * | 3/2011 | Miskatovic | .......... A01K 97/125 |
| | | | 43/17 |

* cited by examiner

ICE FISHING APPARATUS WITH AUDIBLE AND VISUAL BITE INDICATOR

CROSS-REFERENCE TO RELATED APPLICATIONS

This application claims the benefit and priority as a divisional application to U.S. patent application Ser. No. 17/989,573, filed on Nov. 17, 2022, which is incorporated herein by reference in its entirety.

BACKGROUND

The present disclosure relates generally to an ice fishing apparatus, including an ice fishing rod and a tip-up, with an audible and visual bite indicator. Many locations allow persons who are ice fishing to have multiple fishing lines in the water simultaneously. Typically, a bobber or spring bobber is attached to the end of the ice fishing rod, and must be watched continuously to avoid losing a possible strike from a fish. When there are multiple lines in the water, the holes in the ice for each line location must usually be close together so that a person can watch them all at the same time. It would be desirable to provide an audible and visual bite indicator for the ice fishing rod that identifies the occurrence of a strike from a fish, so that a wider spacing of holes in the ice fishing area may be used and so that a strike may be better detected when fishing at night or other low visibility conditions.

SUMMARY

One implementation of the present disclosure is an ice fishing apparatus with an integrated audible and visual bite indication includes a rod handle with a hollow region that encloses a portion of an audible and visual indicator and circuit assembly. The assembly includes a wire that flexes into engagement with a contact pin when a strike from a fish is detected and closes an indication circuit to activate an audible alarm and an LED indicator light.

Another embodiment of the present disclosure is a tip-up with an integrated audible and visual bite indication for use with an ice fishing rod includes a housing that encloses a portion of an audible and visual indicator and circuit assembly. The assembly includes a wire that flexes into engagement with a contact pin when a strike from a fish is detected and closes an indication circuit to activate an audible alarm and release a mast and flag visual indicator.

Another implementation of the present disclosure is an ice fishing apparatus with an integrated audible and visual bite indication. The apparatus includes a handle portion having a first end, a second end opposite the first end, and a hollow region extending at least partially the ends. A rod blank is coupled to the first end of the handle, and an indicator and circuit assembly positioned at least partially within the hollow region. The indicator and circuit assembly includes a first contact pin electrically coupled to a circuit board and extending through a wall of the handle portion, and a second contact pin spaced apart from the first contact pin, and electrically coupled to the circuit board and extending through the wall of the handle portion. An adjustable spring holder is coupled to the first pin along an outside wall of the handle portion. A wire having a first end is coupled to the adjustable spring holder and a second end having a line hook. A portion of the wire is positioned near the second contact pin and is movably engageable with the second contact pin. A piezoelectric buzzer and an LED bite indicator light are electrically coupled to the circuit board. A battery and a switch are electrically coupled to the circuit board to energize the circuit board when the switch is in an on position and deenergize the circuit board when the switch is in an off position.

In some embodiments, a reel is removably coupled to the handle and is configured to hold fishing line that is selectively engageable with the line hook.

In some embodiments, the rod blank includes multiple rod blanks that are interchangeably receivable within the first end.

In some embodiments, the LED bite indicator light and the LED power indicator light are visible externally from the handle portion.

In some embodiments, the LED bite indicator light and the LED power indicator light extend at least partially through the wall of the handle portion.

In some embodiments, at least the circuit board, the first contact pin, the second contact pin, the LED bite indicator light, the piezoelectric buzzer, the battery, and the wire are in electrical continuity to form an indication circuit.

In some embodiments, the indication circuit is open and the LED bite indicator light and the piezoelectric buzzer are off when the portion of the wire is positioned near the second contact pin, and the indication circuit is closed and the LED bite indicator light and the piezo electric buzzer are on to provide an audible and visual bite indication when the portion of the wire is moved to contact the second contact pin.

In some embodiments, a sensitivity of the audible and visual bite indication can be increased by adjusting the spring holder to move the portion of the wire toward the second contact pin, and the sensitivity of the audible and visual bite indication can be decreased by adjusting the spring holder to move the portion of the wire away from the second contact pin.

In some embodiments, a power indicator light is electrically coupled to the indication circuit.

In some embodiments, the switch is positioned on or within the wall of the handle portion.

In some embodiments, the battery is removably located within a battery compartment at or near the second end of the handle portion.

In some embodiments, the portion of the wire that is movable into contact with the second contact pin is, or includes, a coil spring.

Another implementation of the present disclosure is an ice fishing apparatus with integrated audible and visual bite indication, including a handle portion having a first end configured to receive a rod blank, a second end opposite the first end, and a hollow region extending at least partially between the ends. An audible and visual indicator and circuit assembly is provided that includes a first contact pin, a second contact pin, spaced apart from the first contact pin, an adjustable spring holder coupled to the first pin, a wire having a first end coupled to the adjustable spring holder and a second end having a line hook, with a portion of the wire positioned near the second contact pin and movable into contact with the second contact pin. The assembly also includes an audible alarm, an LED bite indicator light, a battery; and a switch. The first contact pin, the second contact pin, the wire, the LED bite indicator light, the audible alarm, the battery, and the switch are in electrical continuity to form an indication circuit, so that the indication circuit is open and the LED bite indicator light and the audible alarm are deactivated when the wire is positioned near, but not in contact with the second contact pin. When the wire is moved into contact with the second contact pin, the indication circuit is closed and the LED bite indicator light and the audible alarm are activated to provide an audible and the visual bite indication.

In some embodiments, the audible and visual indicator and circuit assembly is located at least partially within the hollow region of the handle portion.

Another implementation of the present disclosure is an ice fishing apparatus with integrated audible and visual bite indication that includes a housing, a contact pin and a spring holder coupled to the housing, a wire having a first end coupled to the spring holder and a second end having a line hook, with a portion of the wire positioned near the contact pin and movable into contact with the contact pin. A battery, a piezoelectric audible alarm, and DC motor are positioned within the housing, with the DC motor having an output shaft extending through the outside the housing. A resiliently flexible mast has a first end and a second end, with the first end coupled to the outside of the housing, and the second end of the mast has an indicator flag and is releasably engaged with the output shaft of the DC motor. The contact pin, the wire, the piezoelectric audible alarm, the battery, and the DC motor are in electrical continuity to form a circuit, so that when the wire is positioned near (but not in contact with) the contact pin, the circuit is open and the piezoelectric audible alarm is deactivated and the second end of the mast with the flag is engaged with the output shaft of the DC motor. When the wire is moved into contact with the contact pin, the circuit is closed and the piezo audible alarm is activated and the second end of the mast with the flag is disengaged and released from the output shaft of the DC motor to provide an audible and visual bite indication.

In some embodiments, a switch and a power indicator light are electrically coupled to the battery.

In some embodiments, the mast is formed from a flat spring steel material.

In some embodiments, a bottom side of the housing includes cleats configured to engage an ice surface.

In some embodiments, a clamp is provided on the outside of the housing, and the first end of the mast is adjustably and interchangeably retained to the housing by the clamp.

In some embodiments, the spring holder is operable to adjust the sensitivity of the audible and visual bite indication by increasing or decreasing a gap between the wire and the contact pin.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

4

Figure 1:
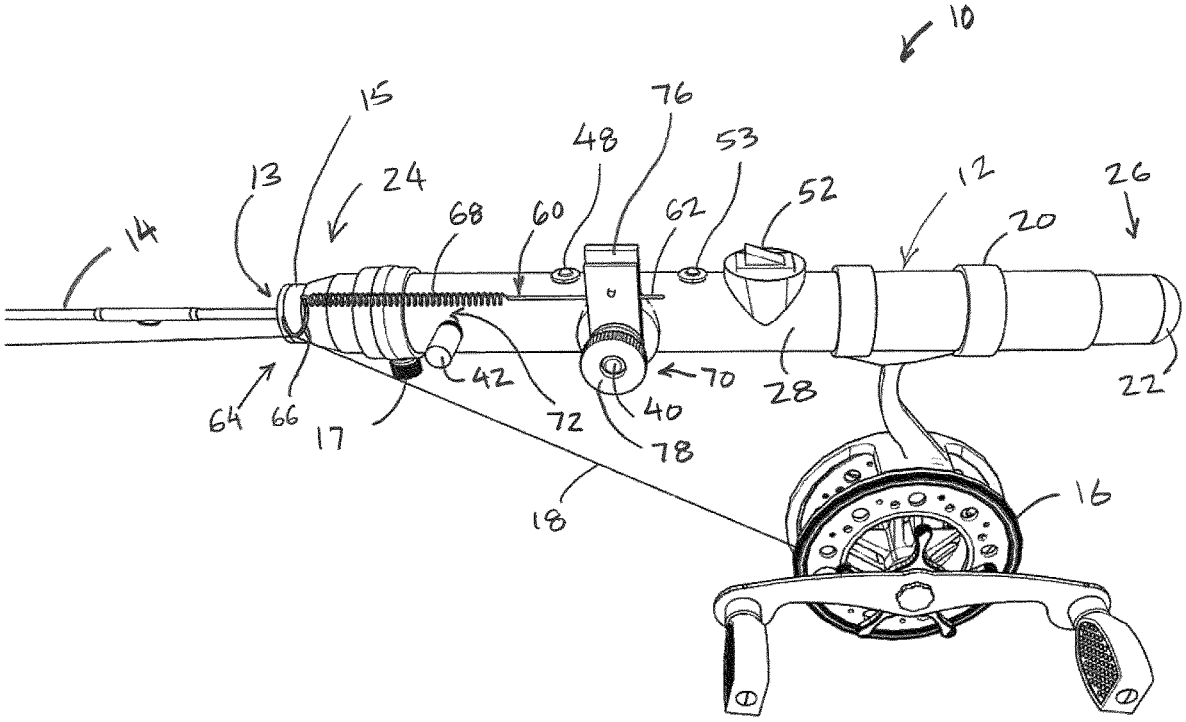
FIG. 1 is a perspective view of a portion of an ice fishing apparatus with an integrated audible and visual bite indication, according to one embodiment.
Figure 2:
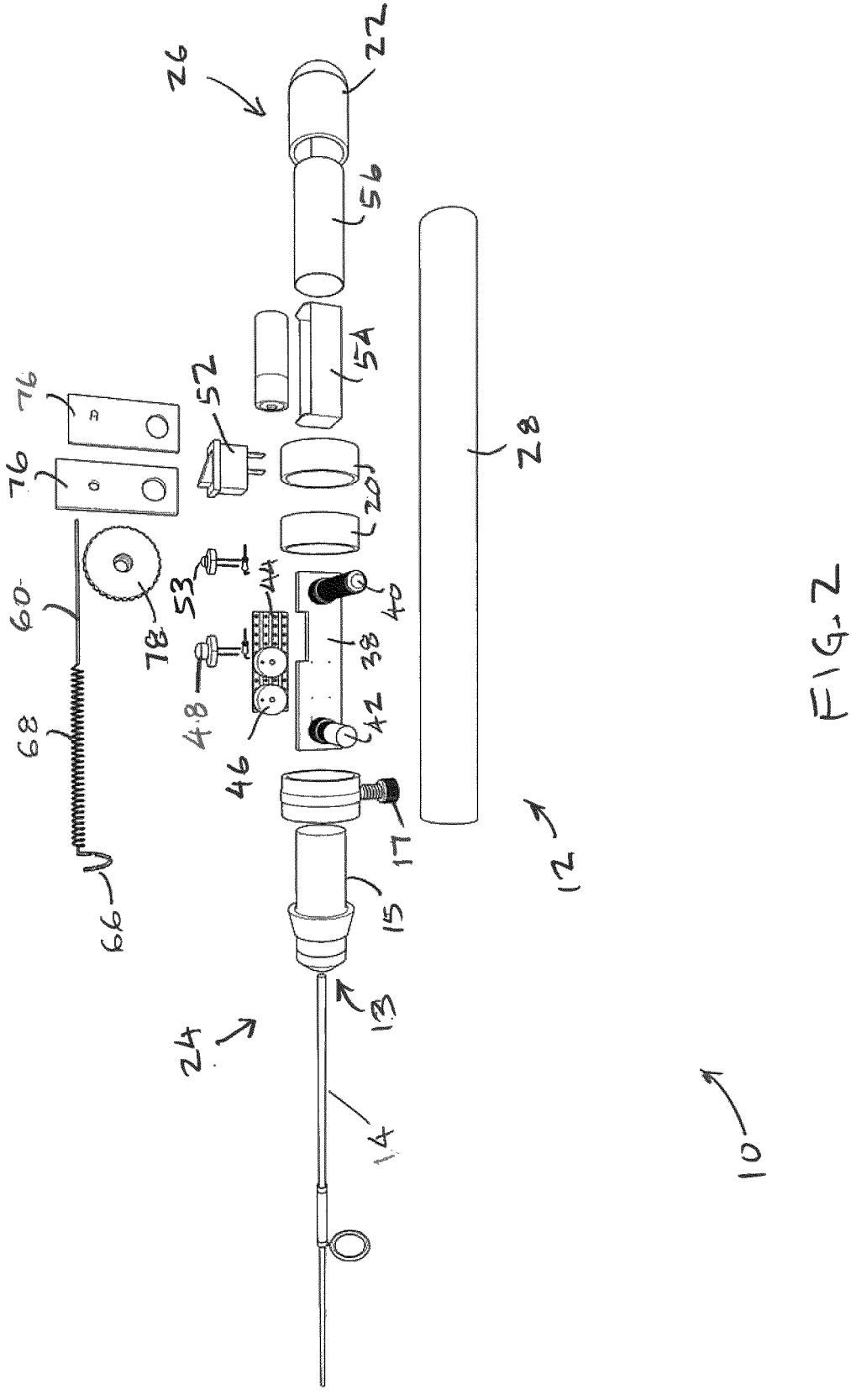
FIG. 2 is an exploded perspective view of the ice fishing apparatus with an integrated audible and visual bite indication, according to the embodiment of FIG. 1.
Figure 3:
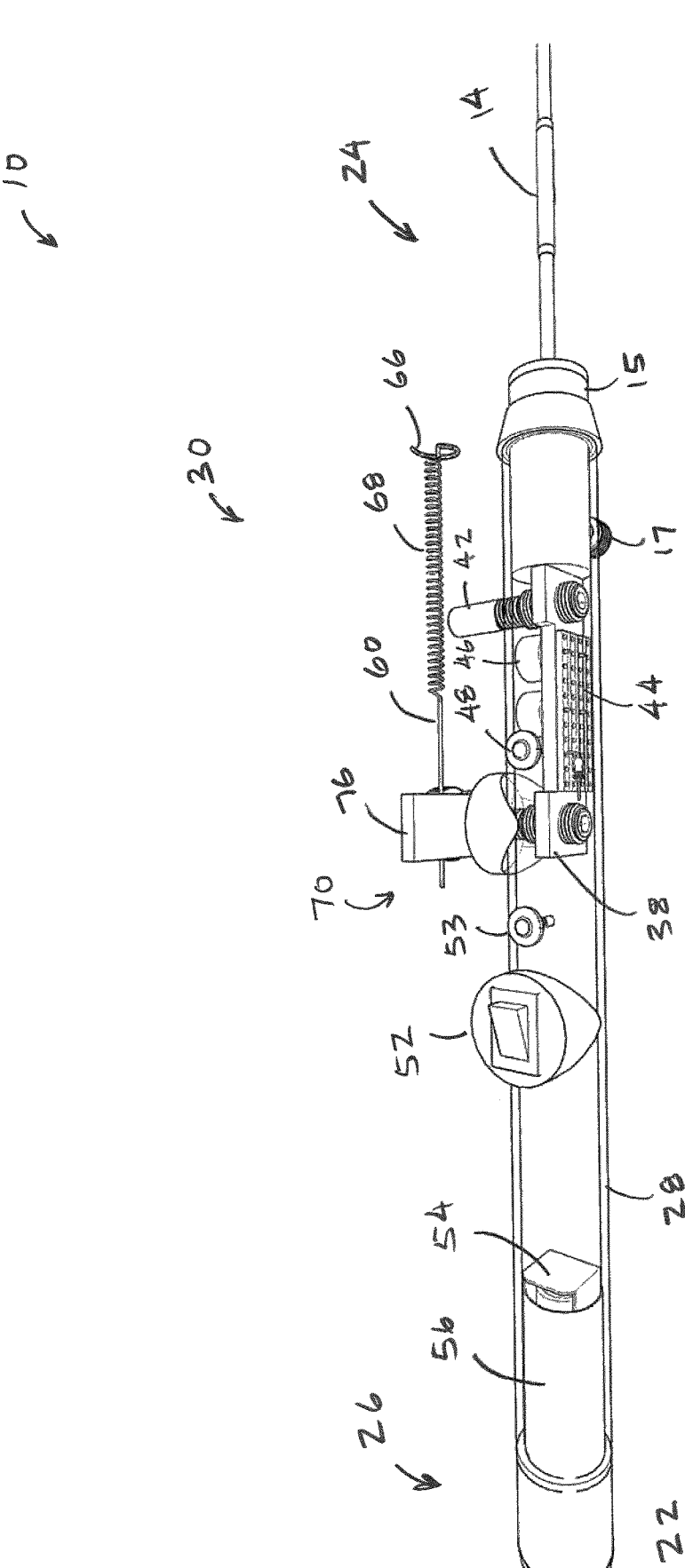

FIG. 3 is a cut-away top perspective view of a portion of the ice fishing apparatus with an integrated audible and visual bite indication, according to the embodiment of FIG. 1.

Figure 4:
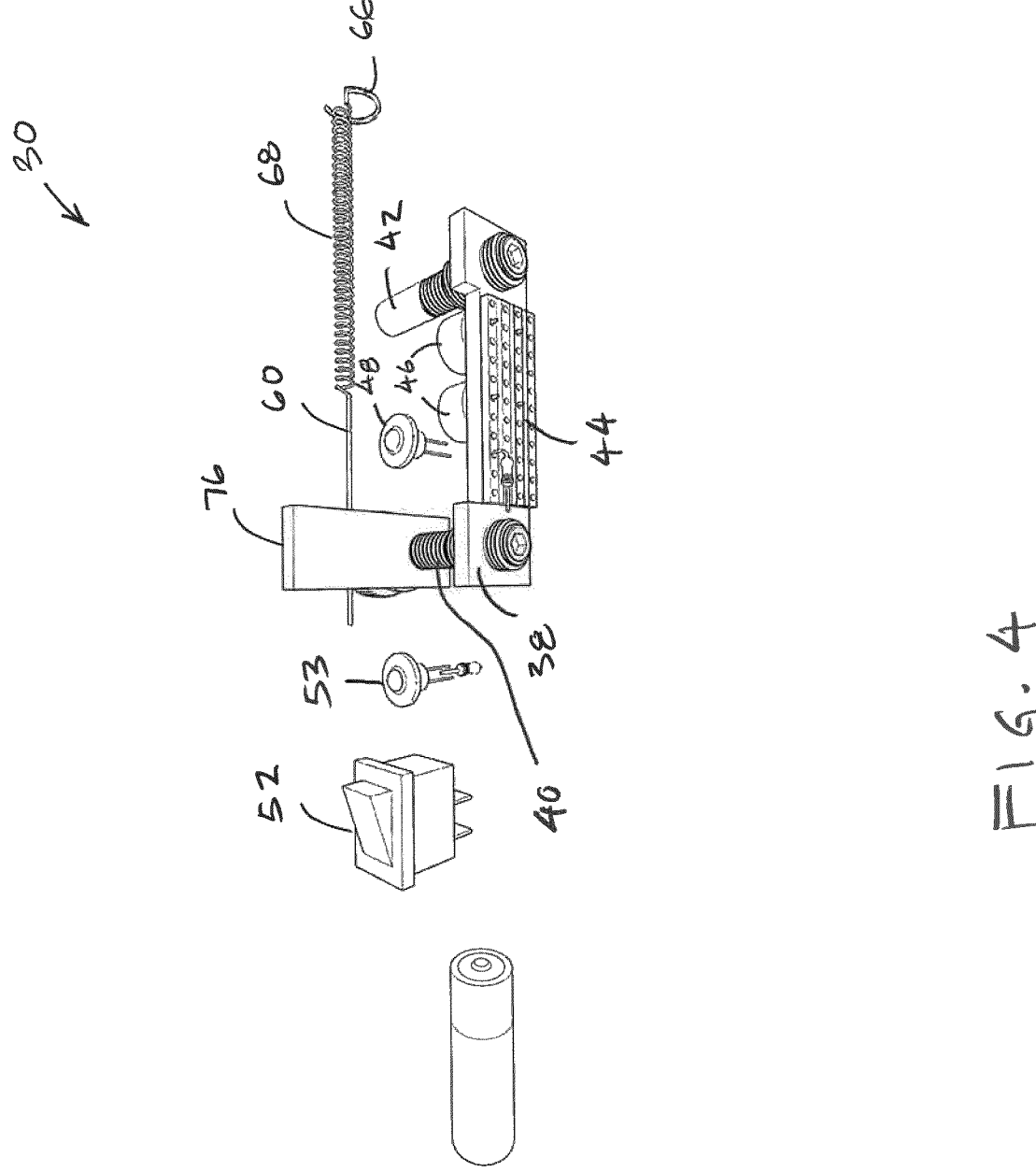

FIG. 4 is an exploded perspective view of an indication and circuit assembly portion of the ice fishing apparatus with an integrated audible and visual bite indication, according to the embodiment of FIG. 1.

Figure 5:
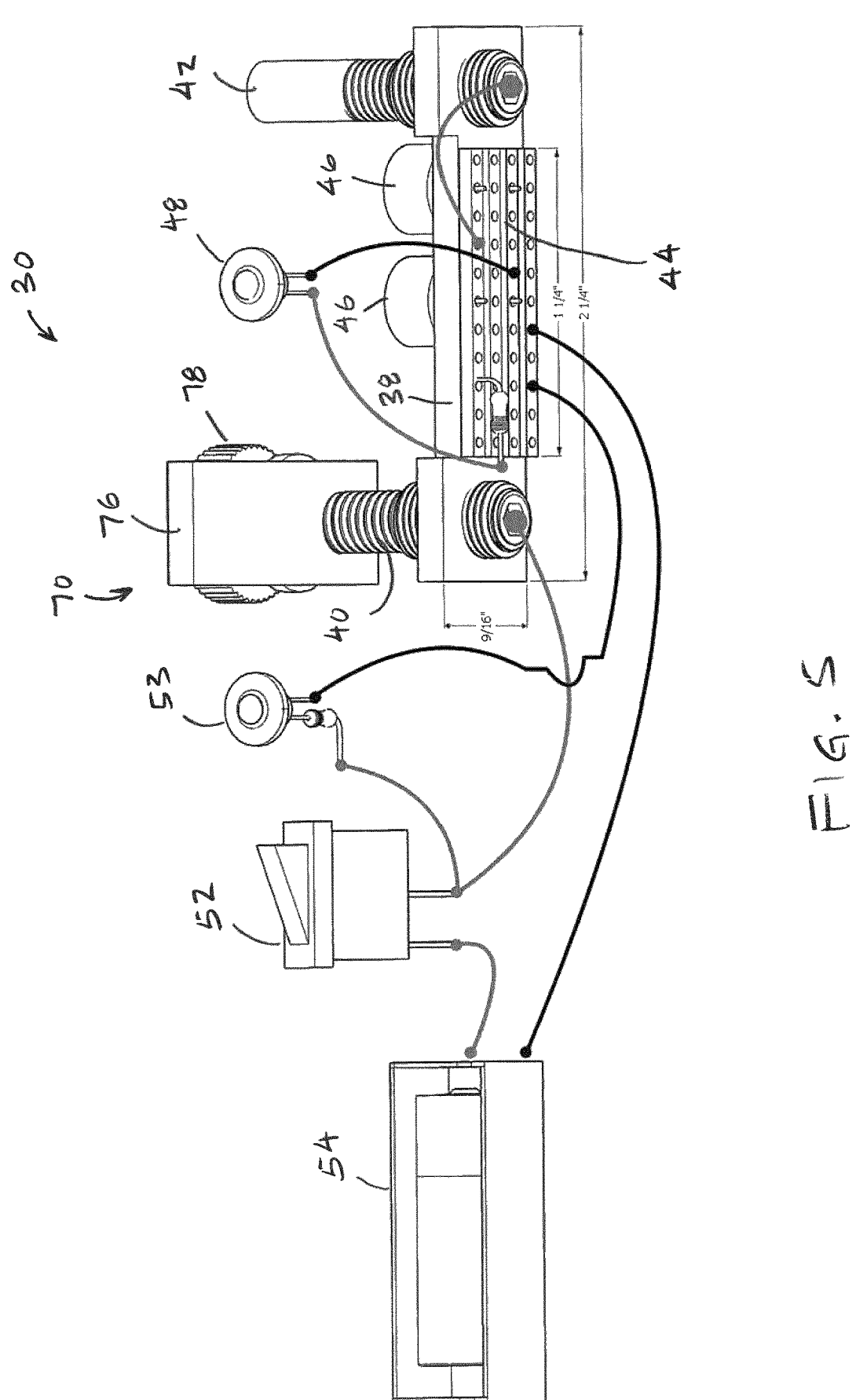

FIG. 5 is schematic wiring diagram of the indication and circuit assembly portion of the ice fishing apparatus with an integrated audible and visual bite indication, according to the embodiment of FIG. 1.

Figure 6:
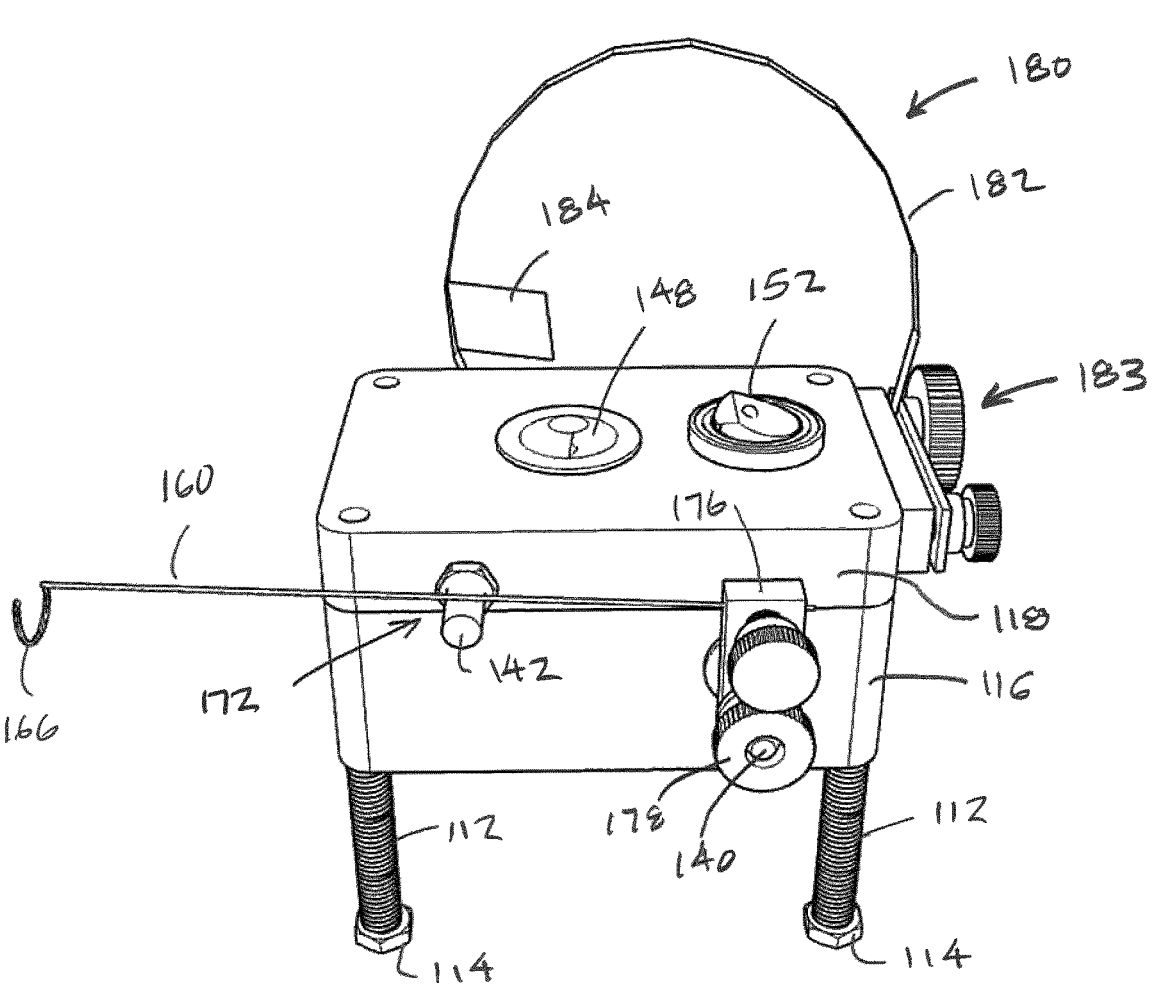

FIG. 6 is a front perspective view of a tip-up apparatus for use with an ice fishing rod to provide an audible and visual bite indication, according to one embodiment.

Figure 7:
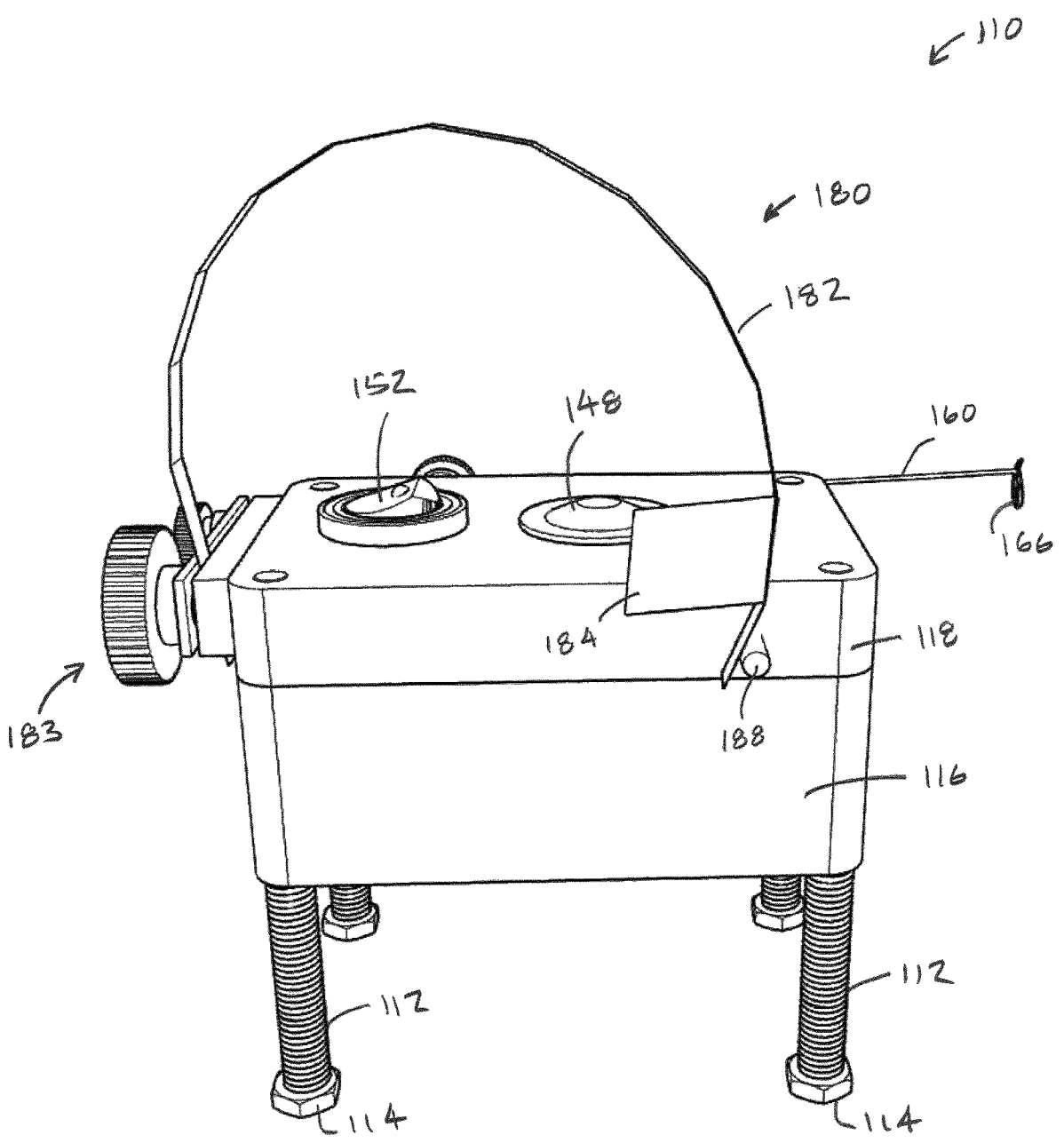

FIG. 7 is a rear perspective view of the tip-up apparatus for use with an ice fishing rod to provide an audible and visual bite indication, according to the embodiment of FIG. 6.

Figure 8:
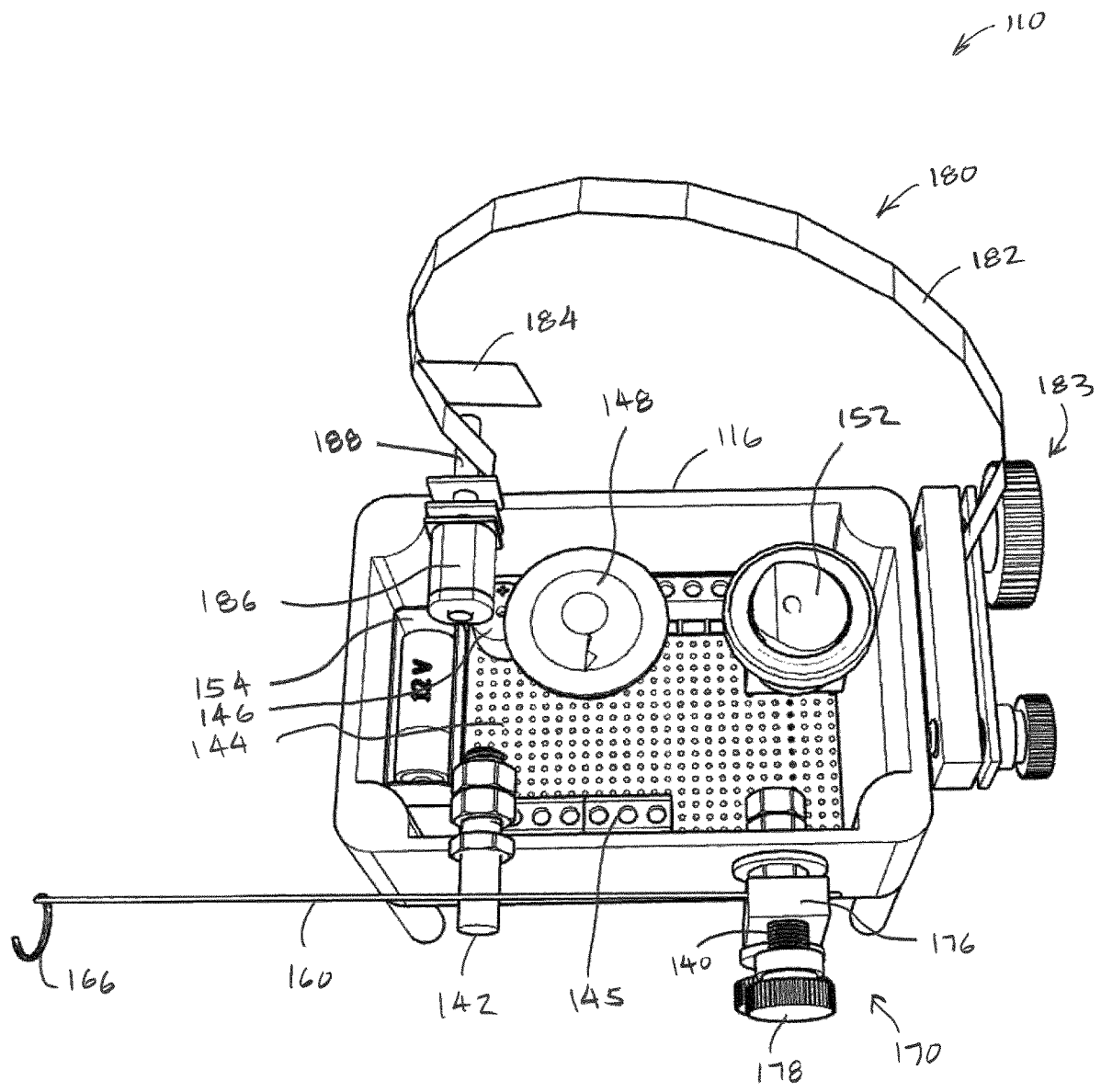

FIG. 8 is a top perspective cut-away view of the tip-up apparatus for use with an ice fishing rod to provide an audible and visual bite indication, according to the embodiment of FIG. 6.

Figure 9:
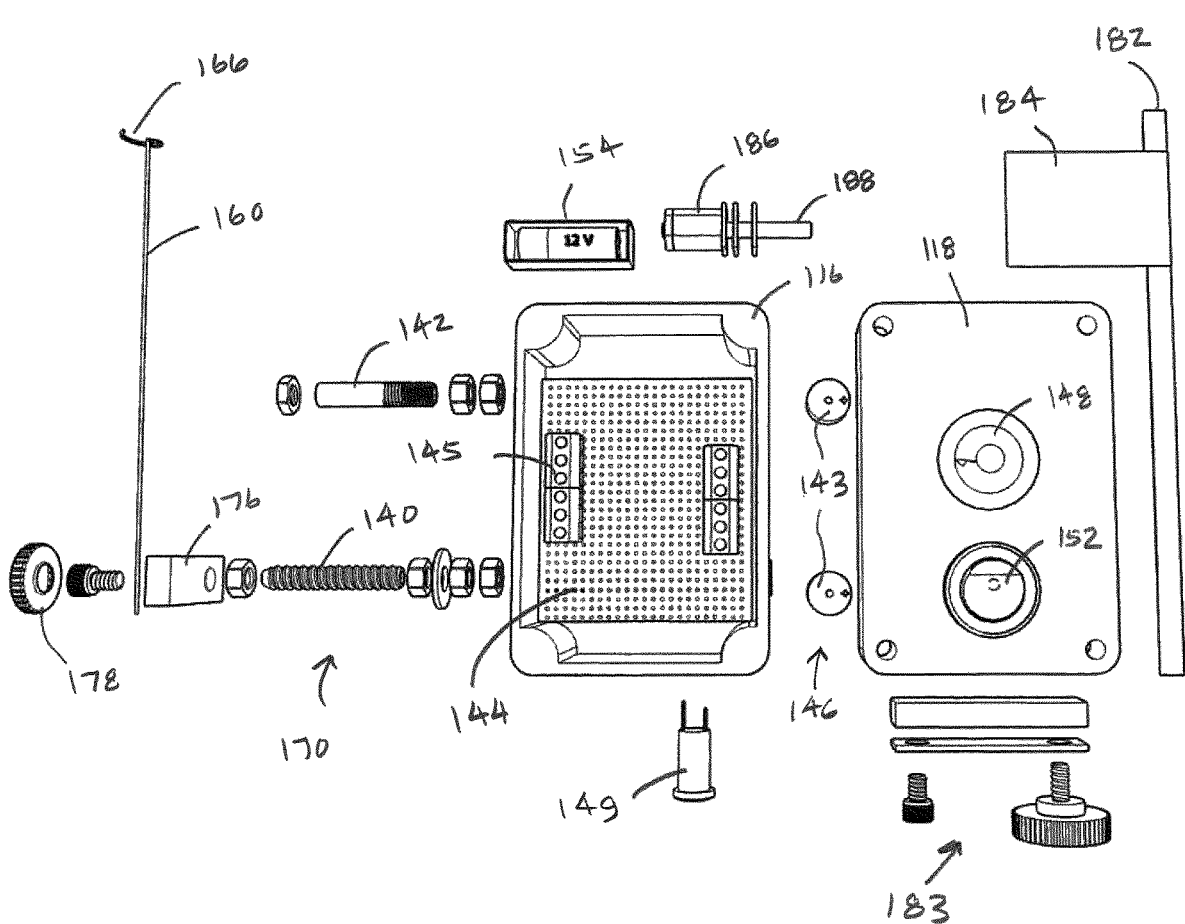

FIG. 9 is an exploded top perspective view of the tip-up apparatus for use with an ice fishing rod to provide an audible and visual bite indication, according to the embodiment of FIG. 6.

Figure 10:
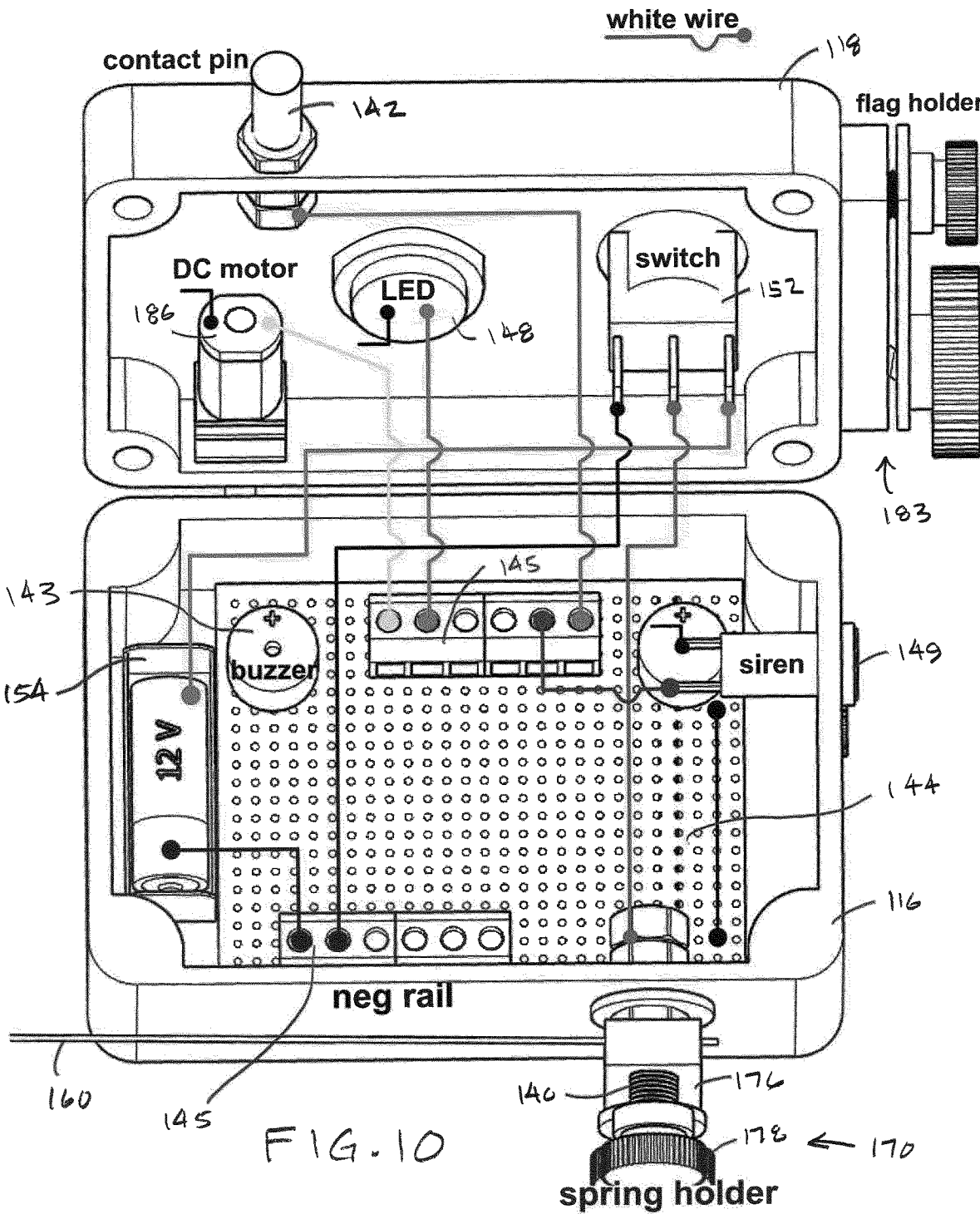

FIG. 10 is a schematic diagram of an indication circuit for the tip-up apparatus for use with an ice fishing rod to provide an audible and visual bite indication, according to the embodiment of FIG. 6.

DETAILED DESCRIPTION

Before turning to the Figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, an ice fishing apparatus is shown having a wire configured to engage a fishing line and sense a fish strike. When a fish strike on the line is detected, the apparatus provides an audible and visual indication of the strike. When a fish strike on the fishing line occurs, the wire moves (e.g. flexes, bends, rotates, etc.) from a non-engagement position into an engagement position with a contact that closes an indication circuit to activate an audible and visual alert (e.g. indicator, signal, alarm, etc.). The ice fishing apparatus may be an ice fishing rod with an integrated indicator and circuit assembly in some embodiments, and may be a tip-up for use with an ice fishing rod in other embodiments, or may be a combination of both.

Ice Fishing Apparatus—Ice Fishing Rod

Overview

Referring to FIGS. 1-5, an ice fishing rod 10 is shown according to an exemplary embodiment. Ice fishing rod 10 is shown to include a handle portion 12, a rod blank 14, a reel 16 detachably coupled to the handle portion 12, and fishing line 18 stored on the reel 16. The handle portion 12 includes a first end 24 located toward the rod blank 14, which is configured to releasably receive a butt-end of the rod blank 14, a second end 26 located opposite the first end 24, and a tubular (e.g. hollow, etc.) region 28 extending generally between the first end 24 and the second end 26. The handle portion 12 may also include a reel holder 20 for releasably coupling the reel 16 to the handle portion 12, and an end cap 22 (e.g. formed from rubber, plastic, cork, etc.) at the second end 26 for providing access to a hollow region 28 within the handle portion 12. The handle portion may be formed from a suitable material such as high-impact plastic, PVC, etc. An exterior surface of the handle portion may be with a coating, such as a rubber or rubberized coating, or may be provided with an overlapping sleeve of material such as a heat-shrinkable rubber material.

Interchangeable Rod Blank Holder

Referring to FIG. 1, the rod blank 14 is removably coupled to the handle portion 12 so that rod blanks may be replaced (e.g. in the event of damage, etc.) or interchanged with different size/strength rod blanks (e.g. for lighter or heavier fish action, etc.), without having to replace the handle portion 12. This arrangement effectively provides for an all-in-one ice fishing arrangement where any size rod blank may be paired with a handle having integrated audible and visual bite indication. A receptacle 13 and clamp 15 are provided at the first end 24 for releasably receiving and securing the butt-end of the rod blank 14 into the handle portion 12. Clamp 15 may be, or include, a collar with a set-screw 17, or a band-type clamp (not shown), or a threaded collar or chuck (not shown) having an aperture that expands or contracts upon rotating the collar in opposite directions to release and secure the rod blank 14.

Indicator and Circuit Assembly

Referring more particularly to FIGS. 2-5, the ice fishing apparatus is shown to include an indicator and circuit assembly 30. Indicator and circuit assembly 30 is shown integrated into (or with) the handle portion 12 to provide a one-piece, self-contained, ice fishing apparatus that includes both visual and audible indication of a fish strike, without needing separately attachable components or devices. According to the illustrated embodiment, the assembly 30 is integrated at least partially within the hollow region 28, and partially on an exterior of the handle portion 12. Assembly 30 includes a mounting plate 38 disposed within the hollow region 28 and having a first contact pin 40 and a second contact pin 42 attached thereto, which extend through apertures on a side of the handle portion 12. A circuit board 44 is coupled to the mounting plate 38, and includes an audible bite indicator 46 (which may be, or include, a piezoelectric buzzer, beeper, siren, etc.), a visual bite indicator 48 (which may be, or include, a light emitting diode LED), which are shown extending through apertures in a top of the handle portion 12. Resistors 50 are provided for and sized for a desired brightness of the LED's and for proper circuit operation.

Assembly 30 also includes a switch 52 (e.g. manual on/off switch, etc.) and power indicator 53 (such as an LED, etc.) electrically coupled to the circuit board 44 and having an actuator portion (e.g. toggle, button, slider, etc.) extending through the top of the handle portion 12 for easy-access by a user. A battery holder 54 (shown to include a rectangular receptacle 56 and a sleeve 58, such as a brass tube) is disposed within the hollow region 28 near the second end 26, and is electrically coupled to the circuit board 44. The battery holder 54 is accessible through the end cap 22 and is configured to house one or more batteries (e.g. 1.5 VDC battery in size AA, AAA, etc.) that provide a power source to the circuit board.

A resiliently flexible wire 60 includes a first end 62 conductively coupled to the first contact pin 40 by an adjustable spring holder 70. A second end 64 of the wire 60 includes a line hook 66 configured to receive the fishing line 18 between the reel 16 and rod blank 14. In some embodiments, the wire 60 may include a spring portion 68 (e.g. shown as a helical or coil spring, etc.) between the first end 62 and the second end 64 that extends above the second contact pin 42. In this manner, when a fish strike occurs on the fishing line 18, the fishing line 18 pulls downward on the line hook 66 and the wire 60 (including the spring portion 68, if present) is moved (e.g. bent, flexed, etc.) downward into contact with the second contact pin 42.

As shown more particularly in FIGS. 2-5, the components of the assembly 30, including the mounting plate 38, first contact pin 40, second contact pin 42, circuit board 44, audible bite indicator 46, visual bite indicator 48, resistors 50, switch 52, battery compartment 54, battery, and wire 60 are electrically interconnected (e.g. by suitable wiring, conductive materials, etc.) to form a circuit 32. When the battery is installed in the battery holder 54 and the switch 52 is activated by a user to an "on" position, the circuit 32 remains in a normal "open" condition due to the gap between the wire 60 and the second contact pin 42. Upon a fish strike on the line 18, the line pulls on the line hook 66 and movement of the wire 60 across the gap 72 and into contact with the second contact pin 42 "closes" or completes the circuit 32, so that the audible bite indicator 46 and visual bite indicator 48 are energized and activated to send an audible and visual signal to a user that a fish strike has just occurred.

Sensitivity Adjustment

The sensitivity of the assembly 30 can be adjusted by expanding or reducing the size of the gap 72 (e.g. the distance between the wire 60 and the second contact pin 42). The larger or wider the size of the gap 72, the stronger or greater the fish strike that is needed to flex the wire 60 into contact with the second contact pin 42. Conversely, the smaller or narrower the gap 72, the weaker or smaller the fish strike that is needed to flex the wire 60 into contact with the second contact pin 42. The gap 72 may be adjusted by the adjustable spring holder 70, which includes holder plates 76 having apertures that fit over the outside of the first contact pin 40 and are configured to grip the wire 60 therebetween. The outer surface of first contact pin 40 is shown to include threads, and a thumb screw 78 threadably engages the threads on the first contact pin 40 to clamp the holder plates 76 together against the outside of the handle portion 12. The thumb screw 78 may be loosened to allow the holder plates 76 to be rotationally adjusted about the first contact pin 40 to change a position of the wire 60 (e.g. so that it may be raised or lowered, etc.) relative to the second contact pin 42 to increase or decrease the size of the gap 72. According to some embodiments, a timer device (not shown) may be included in the circuit 32, so that the audible bite indicator 46 and visual bite indicator 48 remain activated for a predetermined time period following the occurrence of a fish strike.

Ice Fishing Apparatus—Tip-Up

Overview

Referring to FIGS. 6-10, a tip-up 110 having an audible bite indication and visual bite indication for use with an ice fishing rod is shown according to an exemplary embodiment. The tip-up 110 is shown as a separate component having audible and visual indicating capabilities that can be paired with any of a wide variety of ice-fishing rods. Tip-up 110 is shown to include a housing 116 and cover 118 that provides a weather-resistant enclosure for a majority of the electrical components of the tip-up 110. Legs 112 are provided at each of the four corners of housing 116. The legs 112 are adjustable in height (e.g. by threadable engagement with apertures in the housing 116) and may have feet 114 for supporting the housing on an ice surface during use. According to some embodiments, feet 114 may include pointed or sharpened edges (e.g. spikes, cleats, etc.) to grip an ice surface and reduce or minimize slipping or sliding of the tip-up during use.

Indicator and Circuit Assembly

Referring more particularly to FIGS. 8-10, the tip-up is shown to include an indicator and circuit assembly 130. Indicator and circuit assembly 130 is shown integrated into the housing 116 and cover 118 to provide a one-piece, self-contained, tip-up that includes both visual and audible indication of a fish strike, for use with any of a wide variety of ice fishing rods. According to the illustrated embodiment, the assembly includes a circuit board 144 and terminal blocks 145 mounted in the housing 116. A first contact pin 140 and a second contact pin 142 extend through apertures on a side of the housing 116 and are secured in place by fasteners.

An audible bite indicator 146 (which may be, or include, a piezoelectric buzzer or beeper 143 and/or a siren 149) are electrically coupled to the circuit board 144 within the housing 116, a first visual bite indicator 148 (which may be, or include, a light emitting diode LED) is coupled to the circuit board 144 and extends through an apertures in a top of the cover 118. Resistors 150 are provided for and sized for a desired brightness of the LED's and for proper circuit operation. A second visual bite indicator 180 is also provided and includes a resiliently-flexible mast 182 releasably-mounted by a clamp assembly 183 on an external surface of the housing 116 and a motor 186 mounted inside the housing 116 and coupled to the circuit board 144, and a motor shaft 188 extending through a wall of the housing 116. Mast 182 may be made of a material such as spring steel and having a first end coupled to the housing by a releasable clamp assembly 190, and a second end having a visual indicator shown as a flag 184. The second end of mast 182 is releasably attachable to the motor shaft 188 when mast 182 is resiliently bent-over into a "set" position. Upon energizing the motor 186 and rotation of the motor shaft 188, the second visual bite indicator 180 is triggered and the second end of mast 182 is released so that the mast 182 and flag 184 snap upwards.

Assembly 130 also includes a switch 152 (e.g. manual on/off switch, etc.) electrically coupled to the circuit board 144 and having an actuator portion (e.g. toggle, button, slider, etc.) extending through the top of the cover 118 for easy-access by a user. A battery holder 154 (shown to include a rectangular receptacle) is electrically coupled to the circuit board 144 within the housing 116 and is configured to hold one or more batteries (e.g. 12 VDC battery, etc.) that provide a power source to the circuit board.

A resiliently flexible wire 160 includes a first end 162 conductively coupled to the first contact pin 140 by an adjustable spring holder 170. A second end 164 of the wire 160 includes a line hook 166 configured to receive a fishing line from an ice fishing rod. In some embodiments, the wire 160 may include a spring portion 168 (e.g. shown as a helical or coil spring, etc.) between the first end 162 and the second end 164 that extends above the second contact pin 142. In this manner, when a fish strike occurs on the fishing line, the fishing line pulls downward on the line hook 166 and the wire 160 (including the spring portion, if present) is moved (e.g. bent, flexed, etc.) downward into contact with the second contact pin 142.

As shown more particularly in FIG. 10, the components of the assembly 130, including the first contact pin 140, second contact pin 142, circuit board 144, terminal blocks 145, audible bite indicator 146, first visual bite indicator 148, motor 186, switch 152, battery compartment 154, battery, and wire 160 are electrically interconnected (e.g. by suitable wiring, conductive materials, etc.) to form a circuit 132. When the battery is installed in the battery holder 154 and the switch 150 is activated by a user to an "on" position, the circuit 132 remains in a normal "open" condition due to a gap 172 between the wire 160 and the second contact pin 142. Upon a fish strike on the fishing line, the fishing line pulls on the line hook 166 and movement of the wire 160 across the gap 172 and into contact with the second contact pin 142 "closes" or completes the circuit 132. When the circuit 132 closes, the audible bite indicator 146 is energized and activated to send an audible signal (e.g. buzzer, beeper, and/or siren) that a fish strike has just occurred. When the circuit 132 closes upon a fish strike, the first visual bite indicator 148 is also activated. First visual bite indicator 148 illuminates the LED on the cover 118 to provide a first visual indication of a fish strike. When the circuit 132 closes upon a fish strike, the second visual bite indicator 180 is also activated. Closure of circuit 132 energizes motor 186 for a predetermined time period to rotate the motor shaft 188. Upon rotation of motor shaft 188, the second visual bite indicator 180 is triggered as the second end of mast 182 with flag 184 is released and springs to an upward, released position to provide a second visual indication of a fish strike.

Sensitivity Adjustment

The sensitivity of the assembly 130 can be adjusted by expanding or reducing the size of the gap 172 (e.g. the distance between the wire 160 and the second contact pin 142). The larger or wider the size of the gap 172, the stronger or greater the fish strike that is needed to flex the wire 160 into contact with the second contact pin 142. Conversely, the smaller or narrower the gap 172, the weaker or smaller the fish strike that is needed to flex the wire 160 into contact with the second contact pin 142. The gap 142 may be adjusted by the adjustable spring holder 170, which includes holder plates 176 (shown as two complimentary holder plates) having apertures that fit over the outside of the first contact pin 140 and are configured to grip the wire 160 therebetween. The outer surface of first contact pin 140 is shown to include threads, and a thumb screw 178 that threadably engages the threads on the first contact pin 140 to clamp the holder plates 176 together against the outside of the housing 116. The thumb screw 178 may be loosened to allow the holder plates 176 to be rotationally adjusted about the first contact pin 140 to change a position of the wire 160 (e.g. so that it may be raised or lowered, etc.) relative to the second contact pin 142 to increase or decrease the size of the gap 172. According to some embodiments, a timer device (not shown) may be included in the circuit 132, so that the audible bite indicator 146 and the first visual bite indicator 148 remain activated for a predetermined time period following the occurrence of a fish strike.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the components and systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. An ice fishing apparatus with integrated audible and visual bite indication, the ice fishing apparatus comprising:
a handle portion having a first end, a second end opposite the first end, and a hollow region extending at least partially therebetween, the handle portion comprising a reel holder positioned between the first end and the second end, the reel holder configured to releasably couple a reel to the handle portion;
an adjustable spring holder positioned between the first end and the reel holder;
a wire coupled to the adjustable spring holder and configured to support a portion of a fishing line;
a rod blank coupled to the first end of the handle portion; and
an indicator and circuit assembly disposed at least partially within the hollow region;
wherein the adjustable spring holder is coupled to the indicator and circuit assembly, the adjustable spring holder and the wire configured to facilitate adjustment of a sensitivity of the indicator and circuit assembly.

2. The ice fishing apparatus of claim 1, wherein:
the indicator and circuit assembly comprises:
a first contact pin electrically coupled to a circuit board and extending from a wall of the handle portion, and
a second contact pin, spaced apart from the first contact pin, and electrically coupled to the circuit board and extending from the wall of the handle portion;
the adjustable spring holder is coupled to the first contact pin; and
the wire comprises a first conductive element end coupled to the adjustable spring holder and a second conductive element end having a hook configured to receive the fishing line, with a portion of the wire disposed proximate the second contact pin and movably engageable with the second contact pin.

3. The ice fishing apparatus of claim 2, further comprising:
a piezoelectric buzzer electrically coupled to the circuit board;
an LED bite indicator light electrically coupled to the circuit board; and
a battery electrically coupled to the circuit board; and a switch electrically coupled to the battery and the circuit board and configured to energize the circuit board in an on position and deenergize the circuit board in an off position.

4. The ice fishing apparatus of claim 2, wherein the sensitivity of the integrated audible and visual bite indication can be increased by adjusting the adjustable spring holder to move the wire toward the second contact pin, and the sensitivity of the integrated audible and visual bite indication can be decreased by adjusting the adjustable spring holder to move the wire away from the second contact pin.

5. An ice fishing apparatus with integrated audible and visual bite indication, the ice fishing apparatus comprising:
a handle portion having a first end, a second end opposite the first end, and a hollow region extending at least partially therebetween;
a rod blank coupled to the first end; and
an indicator and circuit assembly disposed at least partially within the hollow region, the indicator and circuit assembly comprising:
a first contact pin electrically coupled to a circuit board and extending through a wall of the handle portion, a second contact pin, spaced apart from the first contact pin, and electrically coupled to the circuit board and extending through the wall of the handle portion, an adjustable spring holder coupled to the first contact pin proximate an outside wall of the handle portion, a wire having a first wire end coupled to the adjustable spring holder and a second wire end having a line hook, with a portion of the wire disposed proximate the second contact pin and movably engageable with the second contact pin, a piezoelectric buzzer electrically coupled to the circuit board, an LED bite indicator light electrically coupled to the circuit board, a battery electrically coupled to the circuit board, and a switch electrically coupled to the battery and the circuit board and configured to energize the circuit board in an on position and deenergize the circuit board in an off position.

6. The ice fishing apparatus of claim 5, further comprising a reel removably coupled to the handle portion, the reel configured to hold fishing line that is selectively engageable with the line hook.

7. The ice fishing apparatus of claim 5, wherein the rod blank comprises a plurality of rod blanks that are interchangeably receivable within the first end.

8. The ice fishing apparatus of claim 5, wherein the switch is disposed on or within the wall of the handle portion.

9. The ice fishing apparatus of claim 5, wherein the battery is removably disposed within a battery compartment proximate the second end.

10. The ice fishing apparatus of claim 5, wherein the portion of the wire that is movably engageable with the second contact pin comprises a coil spring.

11. The ice fishing apparatus of claim 5, wherein:

the indicator and circuit assembly further comprises an LED power indicator light electrically coupled to the circuit board; and the LED bite indicator light and the LED power indicator light are visible externally from the handle portion.

12. The ice fishing apparatus of claim 11, wherein the LED bite indicator light and the LED power indicator light extend at least partially through the wall of the handle portion.

13. The ice fishing apparatus of claim 5, wherein at least the circuit board, the first contact pin, the second contact pin, the LED bite indicator light, the piezoelectric buzzer, the battery, and the wire are in electrical continuity to form an indication circuit.

14. The ice fishing apparatus of claim 13, wherein the indication circuit is open and the LED bite indicator light and the piezoelectric buzzer are off when the portion of the wire is disposed proximate the second contact pin, and the indication circuit is closed and the LED bite indicator light and the piezoelectric buzzer are on to provide the integrated audible and visual bite indication when the portion of the wire is movably engaged with the second contact pin.

15. The ice fishing apparatus of claim 14, wherein:

the wire comprises a spring positioned above the second contact pin; and a sensitivity of the integrated audible and visual bite indication can be increased by adjusting the adjustable spring holder to move the spring toward the second contact pin, and the sensitivity of the integrated audible and visual bite indication can be decreased by adjusting the adjustable spring holder to move the spring away from the second contact pin.

16. The ice fishing apparatus of claim 13, further comprising a power indicator light electrically coupled to the indication circuit.

17. An ice fishing apparatus with integrated audible and visual bite indication, comprising:

a handle portion having a first end configured to receive a rod blank, a second end opposite the first end, and a hollow region extending at least partially therebetween; and an audible and visual indicator and circuit assembly, comprising:

a first contact pin, a second contact pin, spaced apart from the first contact pin, an adjustable spring holder coupled to the first contact pin, a wire having a first wire end coupled to the adjustable spring holder and a second wire end having a line hook, with a portion of the wire disposed proximate the second contact pin and movably engageable with the second contact pin, an audible alarm, an LED bite indicator light, a battery, and a switch;

wherein at least the first contact pin, the second contact pin, the wire, the LED bite indicator light, the audible alarm, the battery, and the switch are in electrical continuity to form an indication circuit, so that the indication circuit is open and the LED bite indicator light and the audible alarm are deactivated when the wire is disposed proximate the second contact pin, and the indication circuit is closed and the LED bite indicator light and the audible alarm are activated to provide the integrated audible and visual bite indication when the wire is movably engaged into contact with the second contact pin.

18. The ice fishing apparatus of claim 17, wherein the audible and visual indicator and circuit assembly is disposed at least partially within the hollow region of the handle portion.

19. An ice fishing rod with integrated audible and visual bite indication, the ice fishing rod comprising:

a handle having a first end, a second end opposite the first end, and a hollow region extending at least partially therebetween, the handle comprising a reel holder positioned between the first end and the second end, the reel holder configured to releasably couple a reel to the handle;

an adjustable spring holder positioned between the first end and the reel holder;

a wire coupled to the adjustable spring holder and configured to support a portion of a fishing line;

a rod blank extending from the first end;

an indicator and circuit assembly disposed at least partially within the hollow region; and a battery compartment configured to receive a battery, and accessible from the second end;

wherein the adjustable spring holder is coupled to the indicator and circuit assembly, the adjustable spring holder and the wire are configured to facilitate adjustment of a sensitivity of the indicator and circuit assembly.

20. The ice fishing rod of claim 19, wherein the battery compartment is at least partially continuous with the hollow region.

\* \* \* \* \*